June 26, 1956 C. S. WOOLFORD ET AL 2,751,873
CAN BODY SOLDERING APPARATUS
Filed Sept. 4, 1951 5 Sheets-Sheet 5
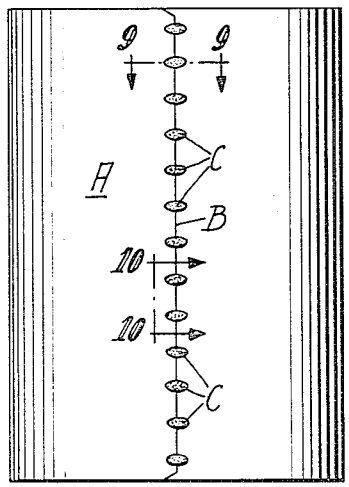
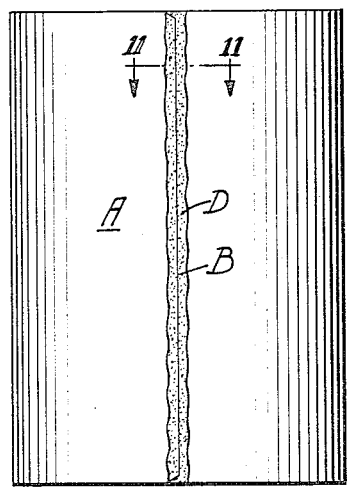
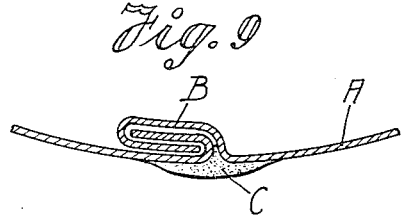
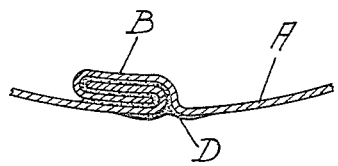
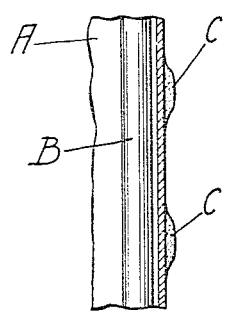
INVENTORS
CUSTIS S. WOOLFORD
WILLIAM H. SCHOENFELD, JR.
BY Charles H. Eine
Leland R. McCann
George W. Reifer
ATTORNEYS

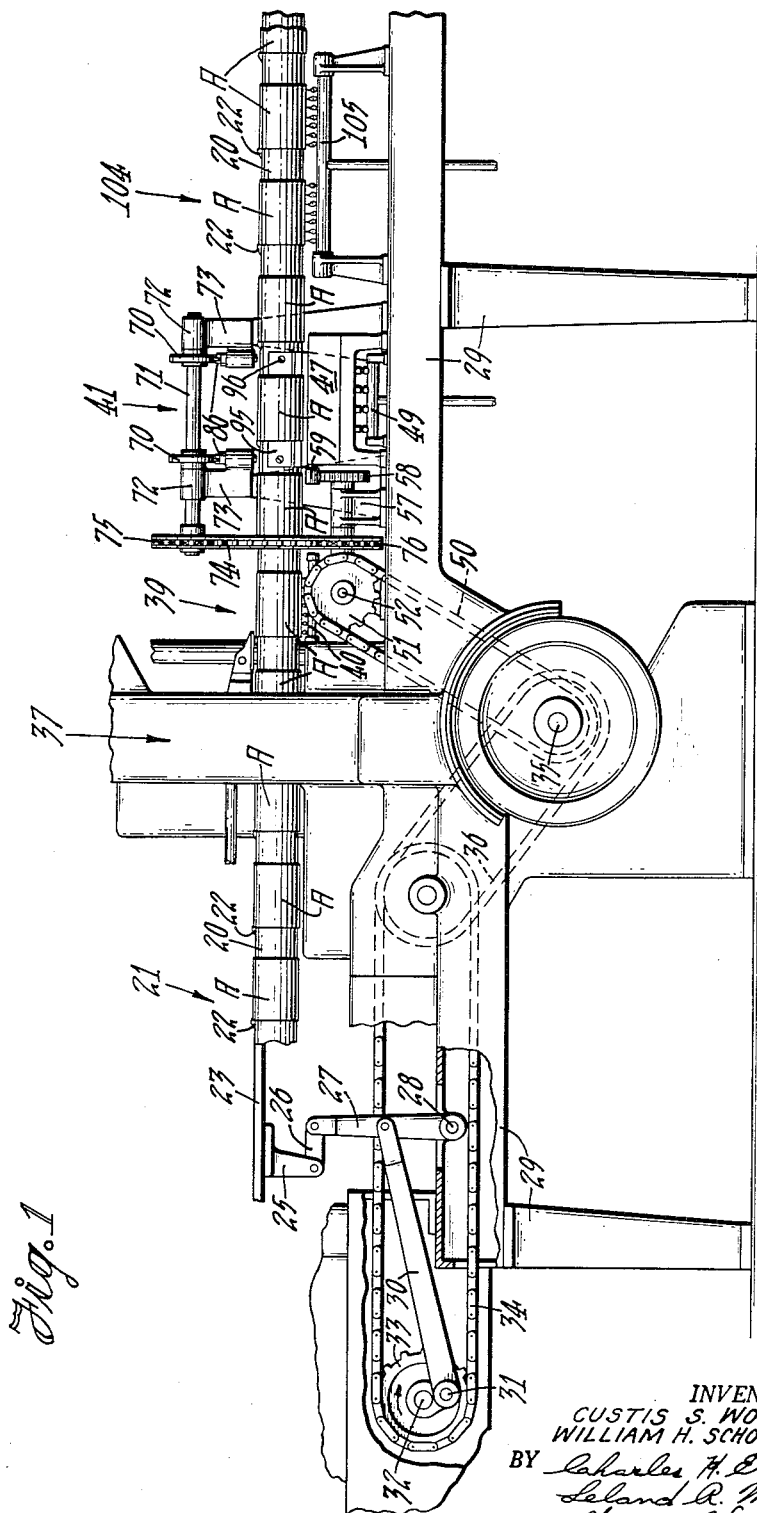

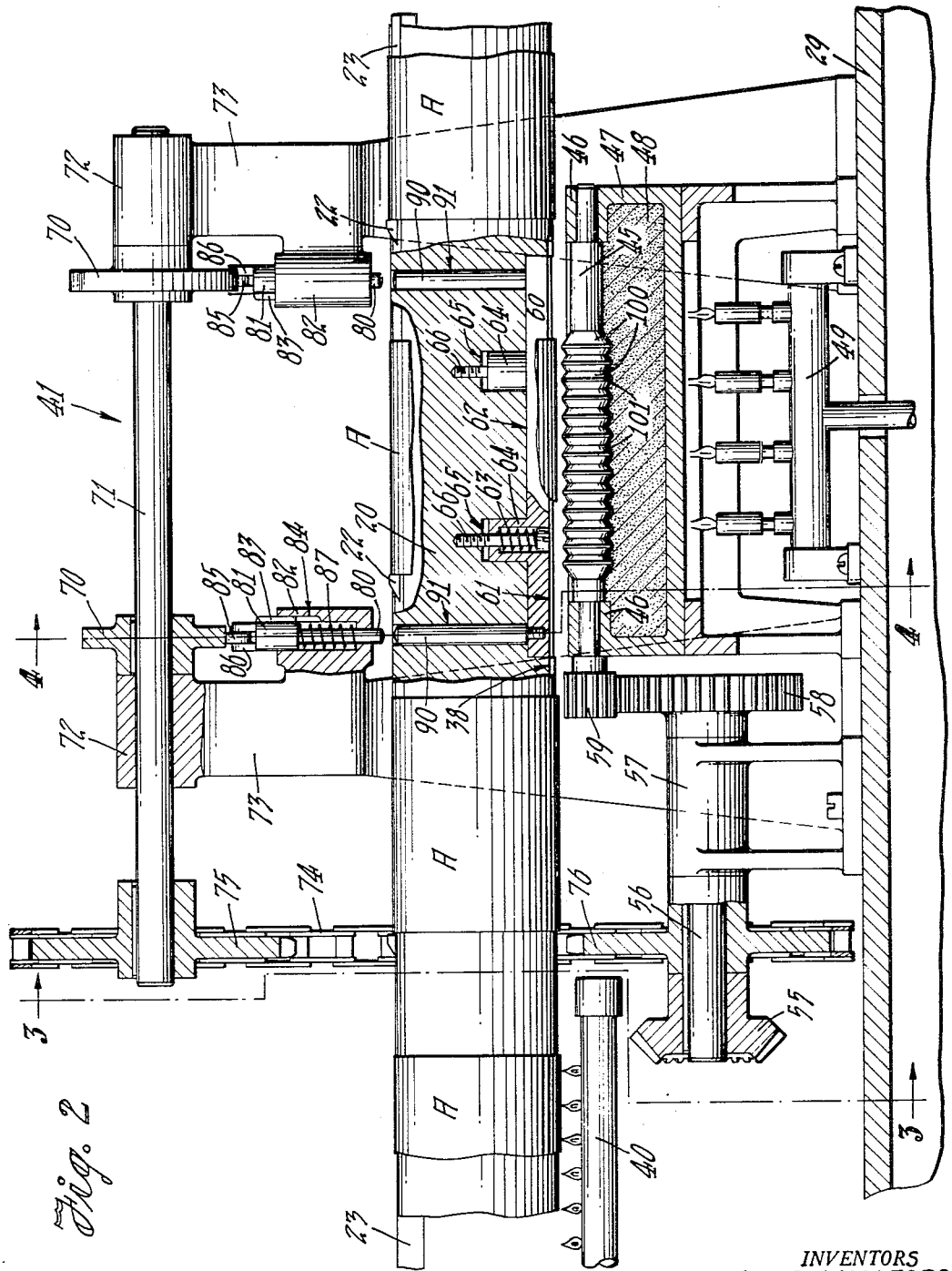

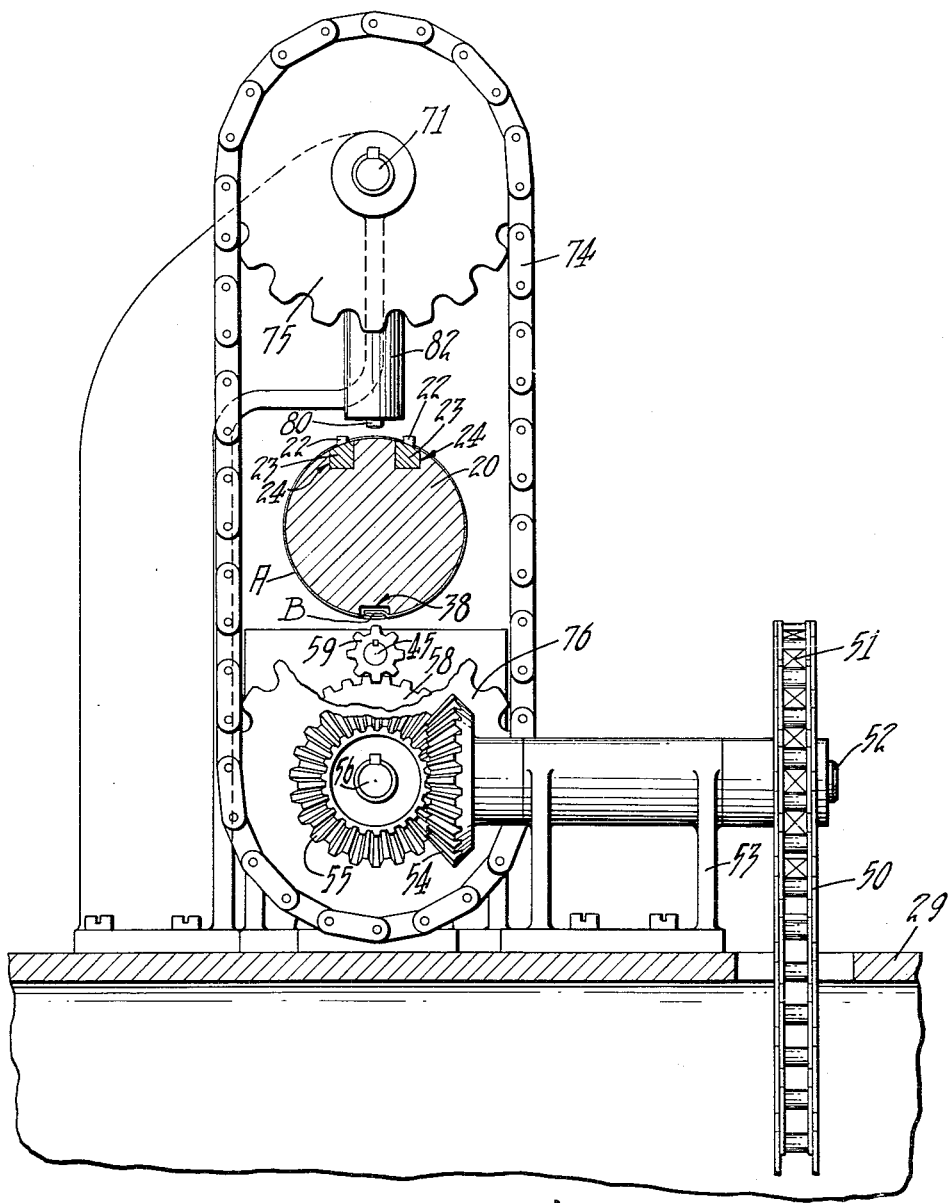

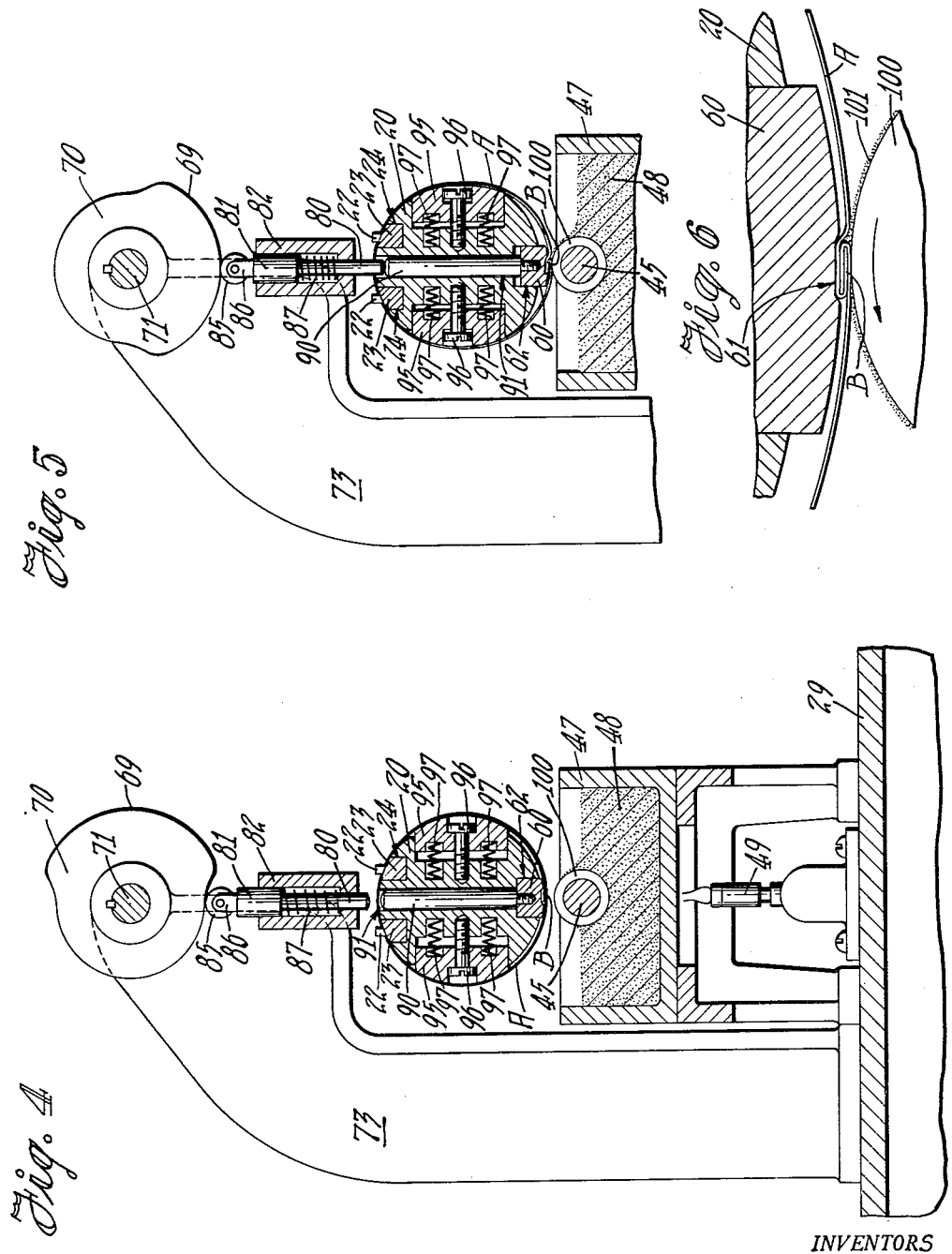

United States Patent Office 2,751,873
Patented June 26, 1956

2,751,873

CAN BODY SOLDERING APPARATUS

Custis S. Woolford, South Orange, N. J., and William H. Schoenfeld, Jr., Glen Ellyn, Ill., assignors to American Can Company, New York, N. Y., a corporation of New Jersey Application September 4, 1951, Serial No. 244,976

7 Claims. (Cl. 113—60)

The present invention relates to can body making and has particular reference to a method of and apparatus for applying a predetermined amount of solder to the side seam area of a formed can body while the body is at rest on the bodymaker horn.

In the can making industry at the present time, can bodies are made in a machine commonly known as a bodymaker wherein flat body blanks are wrapped around an inside horn or mandrel and their opposed edges are hooked together and flattened down or bumped to form interlocked side seams. While in the bodymaker, the can bodies are advanced intermittently along the horn to the various operating stations by reciprocating feed bars.

The formed but unsoldered can bodies are then fed from the bodymaker mandrel and into a separate but contiguous machine known as a soldering machine. Here the can bodies are picked up by a continuously moving endless chain and conveyed in longitudinally spaced relation past a rotating soldering roll, partially submerged in a bath of molten solder, which applies solder to the can body side seams to produce strong, hermetic joints. An excess amount of solder is normally applied to each can body by the solder roll to insure complete soldering of the side seam.

In order to avoid waste of solder and to provide a neat, clean, soldered seam, a rapidly rotating solder wiping roll is utilized to remove the excess solder while the can bodies are still in the soldering machine and the solder is still molten. Some of the excess solder removed from the can bodies is thrown from the rotating solder roll by centrifugal force and enters into the open ends of the longitudinally spaced can bodies as they approach the roll. This solder solidifies upon striking the inside surfaces of the bodies and forms pellets which adhere to the bodies. These objectionable pellets of solder are a major problem to the can making industry and are difficult to eliminate because of the high speeds at which the can bodies are made.

The present invention contemplates preventing the formation of these solder pellets by making it unnecessary to wipe the can body side seams. This is accomplished by applying to each can body, while it is at rest on the bodymaker horn, the optimum amount of solder necessary to adequately seal the side seam. The solder is applied in a molten state, preferably at spaced intervals along the side seam by a ridged or corrugated solder applying roll. The body is then passed over heating elements to sweat the solder into the seam. Since no excess solder is applied to the seam, the usual wiping operation is eliminated and the formation of solder pellets is thus avoided.

An object of the instant invention, therefore, is to provide a can body making method and apparatus wherein a predetermined amount of solder is applied to the side seam of a can body by a rotating solder roll while the body is at rest, the amount of solder applied being the exact amount necessary to properly solder the seam, thus obviating the need for solder wiping.

Another object is to provide a relatively simple, inexpensive apparatus for soldering can body side seams while the bodies are still on the forming horn of the bodymaker in order to substantially eliminate the usual separate soldering machine which is costly and requires extensive factory floor space.

A further object is the provision of a can body making method and apparatus wherein the solder is applied at predetermined, spaced intervals along the outside of the side seam by spaced solder applying lands and allowed to harden into spots or lumps which are subsequently sweated into the seam, it being possible to apply different amounts of solder to different portions of the side seam by varying the intervals between the lands or by varying the size of the lands.

Yet another object is to provide a can body making machine wherein the can body side seam is brought to a rest position in spaced alignment with a smoothly rotating, axisymmetrical solder applying roll, and then moved relative to the roll and pressed into contact with it, thereby obviating bodily movement of the roll to reduce the possibility of splashing of the molten solder while at the same time avoiding scooping of solder into the open front end of the can body.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a machine embodying, and utilized in carrying out the method steps of, the present invention, parts being broken away;

Fig. 2 is an enlarged side elevation of the solder applying station of the machine disclosed in Fig. 1, with parts broken away and parts shown in section;

Fig. 3 is a section taken substantially along the line 3—3 in Fig. 2, with parts broken away;

Fig. 4 is a section taken substantially along the broken line 4—4 in Fig. 2, with parts broken away;

Fig. 5 is a view similar to Fig. 4 but showing the parts of the mechanism in a different position;

Fig. 6 is an enlarged fragmentary detail of certain of the parts illustrated in Fig. 5 and showing how the can body side seam is pressed into contact with the solder applying roll;

Fig. 7 is a side elevation of a can body illustrating how the solder is applied in spots at spaced intervals along the side seam by the machine embodying the instant invention;

Fig. 8 is a view similar to Fig. 7 but showing how the solder spots are subsequently sweated into the side seam to form a continuous solder bond.

Figs. 9 and 10 are sectional details taken substantially along the lines 9—9 and 10—10, respectively, of Fig. 7, with parts broken away; and Fig. 11 is a sectional detail taken substantially along the line 11—11 in Fig. 8, with parts broken away.

As a preferred or exemplary embodiment of the present invention, the drawings disclose an apparatus having a body forming horn or mandrel 20 on which cylindrical can bodies A having longitudinal, interlocked side seams B are formed and soldered. The body forming section, which comprises the left hand portion of the apparatus as seen in Fig. 1 and is generally designated by the numeral 21, is preferably although not necessarily of the construction illustrated in United States Patent 1,770,041, issued to John F. Peters on July 8, 1930, and entitled "Roll Body Maker." Since this section of the machine is illustrated in detail in the Peters' patent, only fragmentary portions of it are shown in the present drawings for the sake of simplicity. In this body forming section, flat body blanks are automatically fed from a magazine and advanced along a flat table (not shown) to a station where the opposed, side seam edges of the blanks are suitably notched. The notched body blanks are then fed transversely of the feed table and are wrapped around the body forming horn 20 by forming rolls (not shown) to form cylindrical can bodies A. The partially formed can bodies A are engaged by spring pressed feed dogs 22 carried on a pair of transversely spaced reciprocating feed bars 23 mounted in grooves 24 formed in the horn 20 and are advanced intermittently along the horn (to the right as seen in Fig. 1) by the movement of the bars 23.

The feed bars 23 are secured to a slide 25 which is connected by a link 26 to an oscillating lever 27 pivoted on a cross-shaft 28 carried by the main frame 29 of the machine. The lever 27 is oscillated about shaft 28 by a crank arm 30 which is connected at one end to the lever 27 and at the other end to a crank 31 mounted on a cross-shaft 32 journaled in the frame 29. The shaft 32 is keyed to a sprocket 33 which is continuously rotated by a chain 34 which in turn is driven from the main drive shaft 35 of the machine through a drive chain 36.

The oscillations of the lever 27 impart a reciprocating motion to the feed bars 23. On each forward stroke of the bars 23 (to the right as seen in Fig. 1) the feed dogs 22 engage behind the bodies A and advance them a predetermined distance, thus locating them successively in the various operating stations disposed along the horn 20. The bodies A remain stationary at these stations during the return stroke of the feed bars 23. As the bodies A are thus intermittently advanced along the horn 20, their side seam edge portions, which previously have been notched, are bent into reversely bent hooks by edging tools, fluxed by a suitable fluxing device, and finally interlocked and pressed together to form lock and lap side seams B at a bumping station which is generally designated by the numeral 37 in Fig. 1. Details of these various operations and mechanisms may be had by referring to the beforementioned Peters' Patent 1,770,041. After the bodies A leave the bumping station 37, the formed side seams B ride in a groove 38 formed at the bottom of the horn 20. This prevents rotation of the bodies on the horn and maintains the seams B in registration for subsequent operations.

As each body A is further advanced along the horn 20, it is preferably presented to a preheating station 39, which, in the illustrated embodiment of the invention includes a gas burner 40 which warms the side seam area of the body to drive off the solvent from the flux which has previously been applied and to prepare the body for the application of solder. Care must be taken to prevent overheating of the can body at the preheating station. If the body is preheated to too high a temperature, the side seam B will bow to a marked degree. This condition should be avoided since it tends to prevent uniform application of solder to the seam B at a solder applying station 41, to which they are next presented.

One can body A is advanced to the solder applying station 41 on each forward stroke of the feed bars 23 and is left there for a short time during the return stroke of the bars. During its advancement into this station 41, the body passes over but is spaced above a small, longitudinal, solder applying roll 45, thus effectively preventing the scooping up of solder from the roll 45 into the open mouth of the can body (see Figs. 2 and 4).

The solder roll 45 is journaled at its ends in bearings 46 formed in a solder reservoir 47 mounted on the main frame 29 beneath the horn 20 and is partially immersed in a bath of molten solder 48 held by the reservoir 47. A gas burner 49, located beneath the reservoir 47, maintains the solder 48 in a molten state.

A constant rotation is imparted to the solder roll 45 by the main drive 35 through a drive chain 50 which operates around a sprocket 51 keyed to one end of a cross-shaft 52 which is held in a bearing 53 (see Figs. 1 and 3). To the other end of the cross-shaft 52 is secured a bevel gear 54 which meshes with a second bevel gear 55, keyed to a longitudinal shaft 56 which is held in a bearing 57 (see Fig. 2). A spur gear 58 is keyed to the other end of the shaft 56 and meshes with and rotates a pinion 59 which is keyed to one end of the solder roll 45, thus rotating the roll.

During the short interval at which the can body A is at rest in the solder applying station 41, its side seam B is brought into contact with the rotating solder roll 45 for a predetermined period of time while the exact amount of solder necessary to perfectly seal the seam is applied.

This contact between the side seam B and the solder roll 45 is brought about by a pressure member or bar 60 (see Figs. 2, 4 and 5) which receives the side seam B in a registration groove 61 which forms a continuation of the groove 38 in the horn 20 and presses it downwardly against the roll.

The pressure bar 60 is disposed in a longitudinal slot 62 formed in the bottom of the horn 20 and is normally held in raised position within the solder horn by a pair of compression springs 63 which are disposed within and engage against the top walls of a pair of hollow vertical bosses 64 formed integral with the pressure bar 60 and disposed in guide bores 65 formed in the horn 20. The lower ends of the springs 63 are confined by the enlarged heads of a pair of bolts 66 disposed in the hollow bosses 64. The stems of the bolts 66 extend upwardly through openings formed in the top walls of the bosses 64 and are threaded into the horn 20.

The pressure bar 60 is actuated downwardly by the high portions 69 of a pair of rotary cams 70 which are keyed to a cam shaft 71 journaled in bearings 72 formed in brackets 73 mounted on the main frames 29. The cams 70 are rotated in synchronism with the feed bars 23 by a drive chain 74 which operates around sprockets 75 and 76 which are keyed to the shafts 71 and 56, respectively.

The cam motion is transmitted to the pressure bar 60 through a pair of plungers 80 having enlarged heads 81 which are mounted for vertical movement in slide bearings 82 formed integral with the brackets 73. Each plunger 80 is prevented from rotating in its bearing 82 by a key 83 which operates in a keyway 84 formed in the bearing, and is provided with a cam follower roller 85 which is mounted in a forked bearing 86 formed integral with the enlarged head 81 (see Figs. 2, 4 and 5). Each cam follower roller 85 is maintained in contact with the cam 70 by a compression spring 87 disposed in the slide bearing 82.

During the forward stroke of the feed bars 23, the lower ends of the plungers 80 are spaced above the top of the horn 20 (see Figs. 2 and 4) in order to permit passage of can bodies A. On the return stroke of the feed bars 23, the high portions 69 of the cams 70 move the plungers 80 downwardly against a pair of pins 90 which are disposed in vertical bores 91 formed in the horn 20 and are attached at their lower ends to the pressure bar 60, thus moving the bar 60 downwardly and pressing the can body side seam B against the solder roll 45 (see Fig. 5) for a predetermined length of time which is determined by the profile of the cams 70. The plungers 80 and pins 90 are in vertical alignment and are located longitudinally so as to provide clearance for their movement in the spaces between passing can bodies on the horn 20.

This downward movement of the can body side seam area results in the reforming of the round can body A into a substantially oval shape having an elongated vertical diameter and a shortened horizontal diameter (see Figs. 4 and 5). In order to permit the necessary inward movement of the sides of the can body, the radius of the lower portion of the horn 20 is reduced at the solder applying station 41 and movable or yieldable blocks 95 are inserted into its sides (see Figs. 1, 4 and 5). These blocks are mounted for horizontal movement on bolts 96 secured in the horn 20, and are normally held in expanded position by compression springs 97 mounted in bores formed in the blocks 95 and the horn 20.

The solder roll 45 against which the side seam B is pressed is preferably formed with a plurality of spaced annular ridges or corrugations 100, each of which is provided with a narrow can contacting land 101 which carries molten solder up from the solder bath 47 to the side seam. In order to carry out the preferred method steps of the invention, the thermal output of the pre-heater 40 is preferably regulated so that the temperature of the can body at the time the solder is applied is still below the temperature at which the solder will sweat into the folds of side seam B. Thus, although a small amount of the solder does enter the side seam, the major portion of it is caused to congeal or set on the outside of the seam almost as soon as it is deposited by the lands 101, thus forming a series of spaced solder lumps or spots C along the outside of the seam (see Figs. 7, 9, 10).

The lands 101 of the solder roll 45 are so spaced that the amount of solder thus deposited is carefully controlled so that the optimum amount of solder necessary to form a perfectly soldered side seam B is applied to the seam. The duration of contact between the side seam B and the solder roll 45, as determined by the shape of the cams 70, the speed of rotation of the solder roll 45, and the axial dimensions of the ridges 100 and the lands 101 are, of course, factors in this control.

Although Fig. 7 illustrates solder applied along the seam B in lumps or spots C of uniform size and spacing, the instant invention may be utilized to apply different amounts of solder to different portions of the seam. This can be accomplished either by varying the size of the lands 101 in the solder roll 45, or by varying the spacing between the ridges 100. Thus, the invention is not only suited to the soldering of the usual types of side seams such as lock and lap seams but is also adaptable to a variety of other side seams and soldering conditions.

After the can body has been pressed against the solder roll 45 for the desired length of time, the high portions 69 rotate away from the cam follower rollers 85, thereby allowing the plungers 80 and the presser bar 60 to move upwardly to their normal positions under the pressure of the springs 87 and 63 respectively. The can body A is simultaneously reformed to its normal cylindrical shape by the yielding expansion blocks 95 (see Fig. 4).

The feed bars 23 having reached the end of their return stroke, the body A is now engaged by the feed dogs 22 in the space provided between the can bodies and removed from the soldering station and advanced along the horn 20 to and through a solder sweating station 104 (see Fig. 1). Here a heating element, which preferably consists of a suitable gas burner 105, heats the solder and the can body side seam area to a temperature sufficiently high to cause the solder to sweat into the folds of the side seam B (see Fig. 11). As seen in Fig. 8 the solder runs together, thereby creating a continuous solder bond and forming a strong, hermetic side seam. Most of the solder sweats into the seam, leaving only a narrow solder stripe D on the outside of the body which requires no wiping.

After the bodies A pass through the sweating station 104, they continue their advance and are discharged from the free end of the horn 20 (not shown) to any suitable place of deposit. Since the horn 20 in the illustrated machine is somewhat longer than normal, the discharge end preferably is supported by a supporting mechanism (not shown) which does not interfere with the discharge of the bodies. An example of a suitable supporting mechanism is illustrated in United States Patent 1,317,929 issued to August Lokan on October 7, 1919, and entitled "Can Making Machine." The other end of the horn is, of course, rigidly mounted in the body forming section of the machine.

As a modified form of the invention, the inside horn 20 may terminate shortly beyond the soldering station 41. In such a simplified construction, the bodies are delivered from the horn before the solder is thoroughly sweated into the seams B and the sweating operation is subsequently performed in a separate sweating mechanism.

It is thought that the invention and many of its attendant advantages will be understood from the foregoing description, and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

We claim:

1. A machine for making can bodies, comprising an inside horn for supporting a can body having a side seam, means for intermittently advancing said can body along said horn to and past a solder applying station, a rotating solder applying roll disposed at said station and extending longitudinally of said horn adjacent the path of travel of said side seam, said roll being spaced from said horn and from said side seam as said body is moved into and out of said station by said advancing means, and pressure means disposed at said station for moving said can body side seam interposed between said horn and said solder applying roll toward and against said roll while said can body is at said station between advances, at least a portion of said horn at said station being yieldably mounted to permit said side seam to move toward said solder applying roll.

2. The machine of claim 1 wherein said solder applying roll has an effective soldering length substantially equal to the length of said side seam and comprises a plurality of longitudinally spaced solder applying lands.

3. A machine for making can bodies, comprising an inside horn for supporting a can body having a side seam, means for intermittently advancing said can body along said horn to and past a solder applying station, a rotating solder applying roll disposed at said station and extending longitudinally of said horn adjacent the path of travel of said side seam, said roll being spaced from said horn and from said side seam as said body is moved into and out of said station by said advancing means, and pressure means disposed at said station for altering the normal cross-sectional shape of said body and pressing said side seam toward and against said solder applying roll while said body is at said station between advances, said body supporting horn being formed with a reduced cross-sectional shape at said solder applying station to permit the alteration of the cross-sectional shape of said can body by said pressure means.

4. The machine of claim 3 wherein said solder applying roll has an effective soldering length substantially equally to the length of said side seam and comprises a plurality of longitudinally spaced solder applying lands.

5. A machine for making can bodies, comprising an inside horn for supporting a can body having a side seam, means for intermittently advancing said can body along said horn to and past a solder applying station, a rotating solder applying roll disposed at said station and extending longitudinally of said horn adjacent the path of travel of said side seam, said roll being spaced from said horn and from said side seam as said body is moved into and out of said station by said advancing means, pressure means disposed at said station for altering the normal cross-sectional shape of said body and pressing said side seam toward and against said solder applying roll while said body is at said station between advances, a recess formed in said body supporting horn at said solder applying station, an expansion block yieldably mounted in said recess, said block being movable inwardly under pressure from said body when its cross-sectional shape is altered by said pressure means, and means for moving said expansion block outwardly to restore said body to its normal cross-sectional shape after solder has been applied to said side seam by said roll and preparatory to movement of said body out of said solder applying station by said advancing means.

6. A machine for making can bodies, comprising an inside horn for supporting a can body having a side seam, means for intermittently advancing said can body along said horn to and past a solder applying station, a rotating solder applying roll disposed at said station and extending longitudinally of the path of travel of said side seam and being spaced away from said horn and said side seam as said body is advanced along said horn into and out of said solder applying station, said roll having an effective soldering length substantially equal to the length of said side seam, a pressure bar disposed in said horn inwardly of said seam when said body is at said station, means for moving said pressure bar outwardly to alter the normal cross-sectional shape of said body and to press said side seam against said solder applying roll while said body is at said solder applying station between advances, a pair of expansion blocks mounted in said horn at said station, said blocks being movable inwardly under pressure from said body when its cross-sectional shape is altered by said pressure bar, and means for moving said expansion blocks outwardly to restore said body to its normal cross-sectional shape after solder has been applied to said side seam by said roll and preparatory to movement of said body out of said solder applying station by said advancing means.

7. The machine of claim 5 wherein said solder applying roll comprises a plurality of longitudinally spaced solder applying lands.

References Cited in the file of this patent

UNITED STATES PATENTS

| | | |
|---|---|---|
| 702,168 | Williams | June 10, 1902 |
| 776,473 | Johnson | Nov. 29, 1904 |
| 818,439 | Heindorf | Apr. 24, 1906 |
| 949,722 | Abrams | Feb. 15, 1910 |
| 962,945 | Coyle | June 28, 1910 |
| 989,249 | Graham | Apr. 11, 1911 |
| 1,666,707 | Kronguest | Apr. 17, 1928 |
| 1,956,344 | Coyle | Apr. 24, 1934 |
| 2,322,845 | Goldsworthy | June 29, 1943 |
| 2,597,893 | Nordquist | May 27, 1952 |